United States Patent
Wang et al.

(10) Patent No.: US 11,124,583 B2
(45) Date of Patent: Sep. 21, 2021

(54) ALKOXY MAGNESIUM SUPPORTED OLEFIN POLYMERIZATION CATALYST COMPONENT, CATALYST AND APPLICATION THEREOF

(71) Applicant: BEIJING LIHE TECHNOLOGY LTD, Beijing (CN)

(72) Inventors: Zhiwu Wang, Beijing (CN); Shuhang Li, Beijing (CN); Huashu Li, Beijing (CN); Junwei Zhang, Beijing (CN); Le Hu, Beijing (CN); Jinsong Dai, Beijing (CN); Qingli Ma, Beijing (CN); Yong Gao, Beijing (CN); Wenjie Jiao, Beijing (CN); Xinghuo Wang, Beijing (CN); Hao Chen, Beijing (CN)

(73) Assignee: BEIJING LIHE TECHNOLOGY LTD, Beijing (CN)

( * ) Notice: Subject to any disclaimer, the term of this patent is extended or adjusted under 35 U.S.C. 154(b) by 0 days.

(21) Appl. No.: 16/449,660

(22) Filed: Jun. 24, 2019

(65) Prior Publication Data

US 2019/0309100 A1 Oct. 10, 2019

Related U.S. Application Data

(63) Continuation of application No. PCT/CN2017/115626, filed on Dec. 12, 2017.

(30) Foreign Application Priority Data

Dec. 23, 2016 (CN) .......................... 201611203375.3

(51) Int. Cl.
| | | |
|---|---|---|
| *C08F 4/6592* | (2006.01) | |
| *C08F 4/649* | (2006.01) | |
| *C08F 4/643* | (2006.01) | |
| *B01J 31/22* | (2006.01) | |
| *C08F 4/02* | (2006.01) | |
| *C08F 4/622* | (2006.01) | |
| *C08F 110/06* | (2006.01) | |
| *C08F 10/00* | (2006.01) | |

(52) U.S. Cl.
CPC ....... *C08F 4/65922* (2013.01); *B01J 31/2295* (2013.01); *C08F 4/02* (2013.01); *C08F 4/6228* (2013.01); *C08F 4/649* (2013.01); *C08F 10/00* (2013.01); *C08F 110/06* (2013.01); *B01J 2231/12* (2013.01); *B01J 2531/0238* (2013.01)

(58) Field of Classification Search
USPC ....................................................... 526/125.6
See application file for complete search history.

(56) References Cited

U.S. PATENT DOCUMENTS

| 6,825,146 | B2 * | 11/2004 | Kilty ........................ | C08F 10/06 |
| | | | | 502/104 |
| 8,288,585 | B2 * | 10/2012 | Chen ...................... | C08F 110/06 |
| | | | | 562/124 |
| 2019/0211118 | A1 * | 7/2019 | Elder ...................... | C08F 10/06 |

FOREIGN PATENT DOCUMENTS

| CN | 1580033 | | 2/2005 | | |
| CN | 1580034 | | 2/2005 | | |
| CN | 1580035 | | 2/2005 | | |
| CN | 101724102 | | 6/2010 | | |
| CN | 102325808 | | 1/2012 | | |
| CN | 103214602 | A * | 7/2013 | ............ | C08F 10/00 |

OTHER PUBLICATIONS

Online translation of Detailed Description of CN 103214602A retrieved from ESPACENET on Jul. 20, 2020; publication date: Jul. 2013 (Year: 2013).*
International search report in PCT/CN2017/115626.
Written Opinion in PCT/CN2017/115626.
International Preliminary Report on Patentability in PCT/CN2017/115626.

* cited by examiner

*Primary Examiner* — Fred M Teskin
(74) *Attorney, Agent, or Firm* — Yong Chen

(57) ABSTRACT

Provided is an alkoxy magnesium supported olefin polymerization catalyst component, comprising the reaction products of the following components: at least one alkoxy magnesium compound of $Mg(OR1')N(OR2')2-N$, at least one titanium compound of general formula $Ti(OR)nX4-n$, at least one ortho-phenylene diester electron donor compound a, and at least one diether electron donor compound b, wherein the molar ratio of a to b is 0.05 to 20. The catalyst component has an ultrahigh polymerization activity when used for olefin polymerization, and does not require the use of an external electron donor, but can also obtain a polymer with a high isotacticity, and the resulting polymer has a relatively wide molecular weight distribution and a relatively low ash content.

9 Claims, No Drawings

ALKOXY MAGNESIUM SUPPORTED OLEFIN POLYMERIZATION CATALYST COMPONENT, CATALYST AND APPLICATION THEREOF

CROSS REFERENCE TO RELATED APPLICATIONS

This application is a continuation of the international application No. PCT/CN2017/115626 filed Dec. 12, 2017, which claims the priority to Chinese Application No. 201611203375.3 filed on Dec. 23, 2016. The disclosure of each of these prior-filed applications is incorporated by reference in its entirety herein.

TECHNICAL FIELD

The present invention relates to a catalyst component for olefin polymerization, and more particularly to an alkoxymagnesium supported olefin polymerization catalyst component, catalyst and application thereof.

BACKGROUND ART

The development of high performance polyolefin resins relies on the continued improvement of the performance of olefin polymerization catalysts. Over the years, more attention has been focused on the use of different magnesium sources to prepare polyolefin catalysts. The performance of catalysts prepared with different magnesium sources is different. Magnesium sources are mainly magnesium powder, organomagnesium compounds (such as dialkylmagnesium, dialkoxymagnesium, alkylmagnesium chloride, etc.) and inorganic magnesium compounds (such as anhydrous magnesium chloride). The obtained polypropylene polymer prepared by supported catalyst component using magnesium dialkoxide as a carrier has excellent properties such as excellent particle morphology, low fine powder content, high activity, and high stereoregularity (EP1,209,172A1, EP1,270,604A1, EP1,260,524A1, EP1,061,088A1). In order to obtain such excellent catalyst component for olefin polymerization, it is necessary to first prepare a dialkoxymagnesium carrier with excellent properties.

There are mainly the following methods for preparing spherical dialkoxymagnesium in the prior art: (1) a method of preparing a dialkoxymagnesium by reacting an alcohol with magnesium, and then mechanically pulverizing to adjust the particle size; (2) a mehod of reacting magnesium with ethanol, with the final addition ratio of magnesium/ethanol in the range of 9/1-1/15, when ethanol and magnesium are refluxed in ethanol, intermittent or continuous reaction is chosen to be controlled; (3) a method of obtaining spherical fine particles by spray-drying alcohol solution of carboxylated magnesium carboxylate and decarboxylating; (4) a method of reacting magnesium with ethanol in a coexistence condition of saturated hydrocarbon.

In addition, it can be seen from the development of the Z-N catalyst that after the first generation of catalysts became available, it was found that a third component (mostly an electron donor, wherein an internal electron donor was added during the preparation of the catalyst, and an external electron donor was added during the polymerization process) has a great impact on the polymerization of the olefin and the polymer properties. Change of the electron donor in the catalyst, in particular, the internal electron donor, can maximize the change in the properties of the active site of the catalyst, thereby maximizing the change in the performance of the catalyst. At present, domestic and international research on internal electron donors is mainly focused on traditional fatty acid esters and aromatic acid ester compounds; diethers (for example, EP0361493, EP0728724) and succinates (for example, WO9856834, WO0063261, WO03022894) compounds; diol esters (eg CN1580033, CN1580034, CN1580035) compounds and the like.

However, although the catalyst using the 1,3-diether compound as the internal electron donor has high activity and good hydrogen regulation sensitivity, the relative narrow molecular mass distribution of the prepared PP is not conducive to the development of different grades of PP. To achieve a higher level of polymer isotacticity, silane is still required as an external electron donor. Chinese patent CN102325808 discloses a procatalyst composition containing an internal electron donor of a phenylene aromatic diester, which is not highly active and has high contents of solubles in xylene in the case of using a silane external electron donor, indicating that the catalyst has poor stereoselectivity to propylene. Chinese Patent No. CN101724102 discloses a catalyst component prepared by combining an internal electron donor glycol ester compound with a 1,3-diether compound and using a magnesium chloride alcohol adduct as carrier, where the catalyst has high activity, but it is only equivalent to the 1,3-diether electron donor catalyst, and it is still required to use a silane external electron donor in order to maintain a high degree of isotacticity.

SUMMARY OF THE INVENTION

An object of the present invention is to provide an alkoxymagnesium supported catalyst component for olefin polymerization, which has ultra-high activity and can obtain a highly isotactic polymer with a wide molecular weight distribution without using an external electron donor.

The alkoxymagnesium supported olefin polymerization catalyst component of the present invention, which comprises the reaction products of the following components:

1) an alkoxymagnesium compound represented by the formula $Mg(OR_1)_N(OR_2')_{2-N}$, wherein $R_1'$ and $R_2'$ may be the same or different and are $C_1$-$C_{20}$ alkyl group, $0 \leq N \leq 2$;

2) at least one titanium compound represented by the formula $Ti(OR)_nX_{4-n}$, wherein R represents a $C_1$-$C_4$ alkyl group; X represents chlorine, bromine or iodine atom; $0 \leq n \leq 4$;

3) at least one electron donor a compound and at least one electron donor b compound;

Wherein the electron donor a compound is selected from the ortho-phenylene diester of the formula (I):

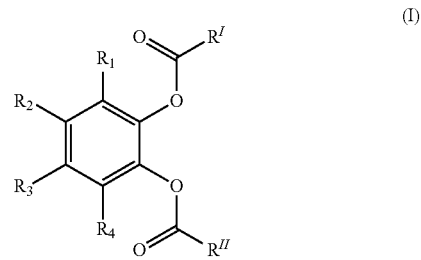

Wherein $R^I$ and $R^{II}$ are the same or different substituted or unsubstituted linear or branched $C_1$-$C_{20}$ alkyl group, $C_3$-$C_{20}$ cycloalkyl group, $C_6$-$C_{20}$ substituted or unsubstituted aryl group, $C_7$-$C_{20}$ substituted or unsubstituted aralkyl group, $C_2$-$C_{10}$ olefin group, $C_{10}$-$C_{20}$ fused ring aryl group or ester group, $R^I$ and $R^{II}$ are not hydrogen; $R_1$-$R_4$ are the same or different and are selected from hydrogen, substituted or unsubstituted $C_1$-$C_{20}$ hydrocarbyl group, $C_1$-$C_{20}$ alkoxy group, heteroatom, and combinations thereof.

As used herein, the terms "hydrocarbyl" and "hydrocarbon" represent substituent comprising only hydrogen and carbon atom, which includes branched or unbranched, saturated or unsaturated, cyclic, polycyclic, fused, or non-cyclic substance, and combinations thereof. Non-limiting examples of hydrocarbyl group includes alkyl, cycloalkyl, alkenyl, diolefin, cycloalkenyl, cyclodiolefin, aryl, aralkyl, alkylaryl and alkynyl groups.

As used herein, the terms "substituted hydrocarbyl" and "substituted hydrocarbon" represent hydrocarbyl group substituted by one or more non-hydrocarbyl substituent groups. Non-limiting examples of non-hydrocarbyl substituent groups are heteroatoms. As used herein, "heteroatom" represents an atom other than carbon or hydrogen. The heteroatom may be non-carbon atom from Groups IV, V, VI, and VII of the Periodic Table of the Elements. Non-limiting examples of heteroatoms include: halogen (F, Cl, Br, I), N, O, P, B, S, and Si. Substituted hydrocarbyl groups also include halohydrocarbyl groups and silicon-containing hydrocarbyl groups. As used herein, the term "halohydrocarbyl" group denotes a hydrocarbyl group substituted by one or more halogen atoms. As used herein, the term "silicon-containing hydrocarbyl group" is a hydrocarbyl group substituted by one or more silicon atoms. The silicon atom may be present in the carbon chain or not.

Wherein the electron donor b compound is selected from the group consisting of diethers of the formula (II):

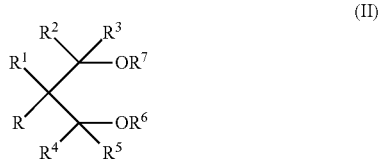
(II)

Wherein R, $R^1$, $R^2$, $R^3$, $R^4$ and $R^5$ may be the same or different and represent H or linear or branched alkyl, cycloalkyl, aryl, alkaryl or aralkyl group having 1 to 18 carbon atoms; $R^6$ and $R^7$ may be the same or different and represent linear or branched $C_1$-$C_{20}$ alkyl group, $C_3$-$C_{20}$ cycloalkyl group, $C_5$-$C_{20}$ aryl group, $C_7$-$C_{20}$ alkaryl and $C_7$-$C_{20}$ aralkyl group; one or more groups of R, $R^1$ to $R^7$ may be linked to form a cyclic structure, each of which may comprise one or more heteroatoms selected from the group consisting of halogen, N, O, S, P, and Si.

The molar ratio of the electron donor a compound to the electron donor b compound is from 0.05 to 20, preferably from 0.1 to 15, more preferably from 0.2 to 10.

One preferred example of the compounds of the electron donor a compound is substituted or unsubstituted linear or branched $C_1$-$C_{20}$ alkyl group, $C_3$-$C_{10}$ cycloalkyl group wherein $R^I$ and $R^{II}$ are the same or different.

Another preferred example of the electron donor a compound is that at least one (or two, or three, or four) of $R^1$ to $R^4$ is not hydrogen, and is selected from the group consisting of substituted $C_1$-$C_{20}$ hydrocarbyl groups, unsubstituted $C_1$-$C_{20}$ hydrocarbyl group, $C_1$-$C_{20}$ alkoxy group, heteroatom, and combination thereof.

The ortho-phenylene diester compound of the electron donor a compound may be specifically selected from the group consisting of:

1,2-benzenediol-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-methyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-methoxy-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-ethyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-propyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-isobutyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-n-butyl-1,2-di[acetate, (n-, iso-)propionate, (n-, iso-, tert-) butyrate, (n-, iso-, neo-, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-ethoxy-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-methyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-ethyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-propyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, 1,2-benzenediol-4-tert-butyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-isopentyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-formyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-acetyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-hydroxy-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-chloro-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-bromo-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,4-dimethyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,4-dimethoxy-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,4-dichloro-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-methyl-5-tert-butyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,5-di-tert-butyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,5-diisopropyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,5-dimethoxy-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,6-dimethyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,6-di-tert-butyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,6-dimethyl-4-isopropyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-isopropyl-4,5-dimethyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-ethyl-5-isobutyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-ethyl-5-tert-butyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-methoxy-5-methyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,4,6-trimethyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,4,6-triisopropyl-1,2-di[acetate, (n-, iso-) propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-naphthalenediol-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

2,3-naphthalenediol-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate].

Further preferred examples of the electron donor a compound are given below:

1,2-benzenediol-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-methyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-4-tert-butyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3-methyl-5-tert-butyl-1,2-di[acetate, (n-, iso-)propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,5-di-tert-butyl-1,2-di[acetate, (n-, iso-) propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,4,6-trimethyl-1,2-di[acetate, (n-, iso-) propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate];

1,2-benzenediol-3,4,6-triisopropyl-1,2-di[acetate, (n-, iso-) propionate, (n-, iso-, tert-) butyrate, (n-, iso-, neo, cyclo) pentanoate, (n-, iso-, neo-, cyclo) hexanoate, heptanoate, octanoate, nonanoate, decanoate, laurate, cinnamate, palmitate, myristate, margarate, stearate, arachidate, acrylate, furoate].

Still another preferred compound of the electron donor a compound is selected from the compounds of the formula (III):

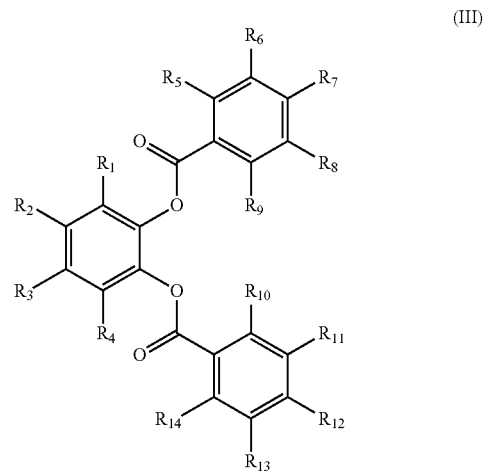

Wherein $R_1$ to $R_{14}$ are the same or different, and each of $R_1$ to $R_{14}$ is selected from the group consisting of hydrogen, substituted $C_1$-$C_{20}$ hydrocarbyl group, unsubstituted $C_1$-$C_{20}$ hydrocarbyl group, and $C_1$-$C_{20}$ alkoxy group, heteroatom, and combination thereof.

One preferred example of the electron donor a compound of the above formula (III) is that at least one of $R_1$ to $R_4$ is selected from the group consisting of substituted $C_1$-$C_{20}$ hydrocarbyl group, unsubstituted $C_1$-$C_{20}$ hydrocarbyl group and combination thereof.

Another preferred example of the electron donor a compound of the formula (III) is that at least one of $R_5$ to $R_{14}$ is selected from the group consisting of substituted $C_1$-$C_{20}$ hydrocarbyl group, unsubstituted $C_1$-$C_{20}$ hydrocarbyl group, $C_1$-$C_{20}$ alkoxy group, heteroatom, and combination thereof.

Specific compounds are selected from the group consisting of:

1,2-benzenediol-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-methyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-methoxy-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-ethyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-propyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-isobutyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-n-butyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-ethoxy-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-methyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-ethyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-propyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-tert-butyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-isopentyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-formyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-acetyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-hydroxy-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-chloro-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-bromo-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,4-dimethyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,4-dimethoxy-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,4-dichloro-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-methyl-5-tert-butyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,5-di-tert-butyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,5-diisopropyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,5-dimethoxy-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,6-dimethyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,6-di-tert-butyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,6-dimethyl-4-isopropyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-isopropyl-4,5-dimethyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-ethyl-5-isobutyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-ethyl-5-tert-butyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-methoxy-5-methyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,4,6-trimethyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,4,6-triisopropyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate].

The above compounds are further preferably selected from the group consisting of:

1,2-benzenediol-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-methyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-n-butyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-methyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-4-tert-butyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3-methyl-5-tert-butyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,6-dimethyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,6-di-tert-butyl-1,2-di[benzoate, 2-methylbenzoate, 2-isopropylbenzoate, 4-methylbenzoate, 4-n- propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate];

1,2-benzenediol-3,4,6-trimethyl-1,2-di[benzoate, 2-methylbenzoate, 2-isopropylbenzoate, 4-methylbenzoate, 4-n-propyl benzoate, 4-isopropyl benzoate, 4-n-butyl benzoate, 4-tert-butyl benzoate, 4-isobutyl benzoate, 4-amino benzoate, 4-fluorobenzoate, 2-chlorobenzoate, 3-chlorobenzoate, 4-chlorobenzoate, 2,4,6-trimethyl benzoate, 3-methoxybenzoate, 4-methoxybenzoate].

The electron donor b compound is preferably selected from the diether compounds of the formula (IV):

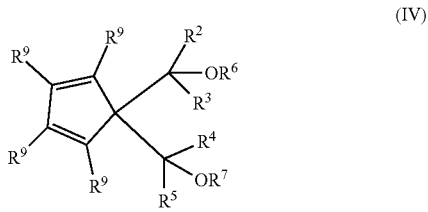

(IV)

Wherein the groups $R^6$ and $R^7$ have the same meanings as in the formula (II), and the groups $R^2$, $R^3$, $R^4$, $R^5$ and $R^9$ are the same or different from each other and selected from hydrogen, halogen; linear or branched $C_{1-20}$ alkyl group; $C_{3-20}$ cycloalkyl group, $C_{6-20}$ aryl group, $C_{7-20}$ alkylaryl group and $C_{7-20}$ arylalkyl group, and two or more $R^9$ groups may be bonded to each other to form a condensed cyclic structure which is saturated or unsaturated, optionally substituted with a group selected from the group consisting of: halogen; linear or branched $C_{1-20}$ alkyl group; $C_{3-20}$ cycloalkyl group, $C_{6-20}$ aryl group, $C_{7-20}$ alkylaryl group and $C_{7-20}$ arylalkyl group; the groups $R^9$ optionally contains one or more heteroatoms as a substituent for a carbon atom or a hydrogen atom or both.

The electron donor b compound is further preferably diether compounds represented by the formula (V):

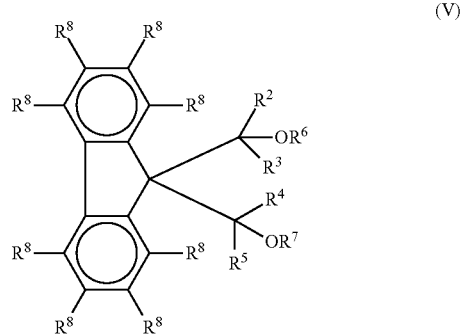

(V)

Wherein the $R^8$ groups are the same or different and are hydrogen, halogen, linear or branched $C_{1-20}$ alkyl group; $C_{3-20}$ cycloalkyl group, $C_{6-20}$ aryl group, $C_{7-20}$ alkylaryl group and $C_{7-20}$ arylalkyl group, optionally containing one or more heteroatoms selected from the group consisting of N, O, S, P, Si, and halogen as a a substituent for a carbon atom or a hydrogen atom or both; the groups $R^2$, $R^3$, $R^4$, $R^5$, $R^6$ and $R^7$ are defined as in the formula (IV).

Specific examples of the ethers include 2-(2-ethylhexyl) 1,3-dimethoxypropane, 2-isopropyl-1,3-dimethoxypropane, 2-butyl-1,3-dimethoxy propane, 2-sec-butyl-1,3-dimethoxy propane, 2-cyclohexyl-1,3-dimethoxy propane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxy propane, 2-(p-fluorophenyl)-1,3-dimethoxypropane, 2-(1-decahydronaphthyl)-1,3-dimethoxy propane, 2-(p-tert-butylphenyl)-1,3-dimethoxy propane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxy propane, 2,2-diethyl-1,3-diethoxy propane, 2,2-dicyclopentyl-1,3-dimethoxy propane, 2,2-dipropyl-1,3-diethoxy propane, 2,2-dibutyl-1,3-diethoxypropane, 2-methyl-2-ethyl-1,3-dimethoxypropane, 2-methyl-2-propyl-1,3-dimethoxy propane, 2-methyl-2-benzyl-1,3-dimethoxy propane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxy propane, 2,2-bis(2-cyclohexylethyl)-1,3-dimethoxy propane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-isopropyl-2-isopentyl-1,3-dimethoxypropane 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-di-n-pentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane.

1,1-bis(methoxymethyl)-cyclopentadiene; 1,1-bis(methoxymethyl)-2,3,4,5-tetramethylcyclopentadiene; 1,1-bis(methoxymethyl)-2,3,4,5-tetraphenylcyclopentadiene; 1,1-bis(methoxymethyl)-2,3,4,5-tetrafluorocyclopentadiene; 1,1-bis(methoxymethyl)-3,4-dicyclopentylcyclopentadiene; 1,1-bis(methoxymethyl)indene; 1,1-bis(methoxymethyl)-2,3-dimethylindene; 1,1-bis(methoxymethyl)-4,5,6,7-tetrahydroindene; 1,1-bis(methoxymethyl)-2,3,6,7-tetrafluoroindene; 1,1-bis(methoxymethyl)-4,7-dimethylindene; 1,1-bis(methoxymethyl)-3,6-dimethylindene; 1,1-bis(methoxymethyl)-4-phenylindene; 1,1-bis(methoxymethyl)-4-phenyl-2-methylindene; 1,1,1-bis(methoxymethyl)-4-cyclohexylindene; 1,1-bis(methoxymethyl)-7-(3,3,3-trifluoropropyl)indene 1,1-bis(methoxymethyl)-7-trimethylsilylindene; 1,1-bis(methoxymethyl)-7-trifluoromethylindene; 1,1-bis(methoxymethyl)-4,7-dimethyl-4,5,6,7-tetrahydroindene; 1,1-bis(methoxymethyl)-7-methylindene; 1,1-bis(methoxymethyl)-7-cyclopentylindene; 1,1-bis(methoxymethyl)-7-isopropylindene; 1,1-bis(methoxy Methyl)-7-cyclohexylindene; 1,1-bis(methoxymethyl)-7-tert-butylindene; 1,1-bis(methoxymethyl)-7-tert-butyl-2-methylindene; 1,1-bis(methoxymethyl)-7-phenylindene; 1,1-bis(methoxymethyl)-2-phenylindene; 1,1-bis (methoxymethyl)-1H-benzo[e]indene; 1,1-bis(methoxymethyl)-1H-2-methylbenzo[e]indene; 9,9-bis(methoxymethyl)fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzopyrene; 9,9-bis(methoxymethyl)-2,3,6,7-dibenzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; 9,9-bis(methoxymethyl)-4-tert-butylfluorene.

The alkoxymagnesium compound in component 1) is selected from the group consisting of magnesium dimethoxide, magnesium diethoxide, magnesium dipropoxide, magnesium dibutoxide, magnesium ethoxymethoxy, magnesium ethoxypropoxy or magnesium butoxyethoxy or the like, which may be used alone or in combination.

The titanium compound in component 2) is selected from the group consisting of titanium tetrachloride, titanium tetrabromide, titanium tetraiodide, titanium tetraethoxide, titanium tetrabutoxide, ethoxy titanium trichloride, methoxy titanium trichloride, propoxy titanium trichloride, n-butoxy titanium trichloride, dimethoxy titanium dichloride, diethoxy titanium dichloride, dipropoxy titanium dichloride, di-n-butoxy titanium dichloride, trimethoxy titanium chloride, triethoxy titanium chloride, tripropoxy titanium chloride or tri-n-butoxy titanium chloride. These titanium compounds may be used alone or in combination. The best effect is achieved when titanium tetrachloride is used.

The alkoxymagnesium supported solid catalyst component of the present invention is prepared as follows: component (2) or an aromatic hydrocarbon or an alkane or a mixture of component (2) with an aromatic hydrocarbon or an alkane in any order or in any combination is mixed one or more times with composition (1) in a range of −20° C.-120° C. to prepare a suspension, and component (3) is contacted with the above mixture one or more times at −20° C.-120° C., a certain temperature is maintained for 30 minutes to 4 hours at 0° C.-130° C., after filtration, aromatic hydrocarbon or alkane is used for washing at a temperature of 20° C.-120° C. for 3-6 times; optionally, the mixture after washing is contacted with component (2) or aromatic hydrocarbon or alkane or a mixture of component (2) with the aromatic hydrocarbon or alkane one or more times at 0° C.-130° C., a certain temperature is maintained for 30 minutes to 4 hours at 0° C.-130° C. each time; finally the catalyst component is obtained after washing with an aromatic hydrocarbon or an alkane for 3 to 6 times and drying.

In the process of preparing the catalyst component of the present invention, the compound a and b of the component (3) may be added separately or in batch in any order, and the molar ratio of the electron donor a to the electron donor b is from 0.05-20, preferably 0.1-15, further preferably 0.2-10.

The preferred method for preparing the catalyst component is to first mix the component (2) with an aromatic hydrocarbon or an alkane to form a suspension, add the component (1) at −20° C. to 30° C., raise the temperature to 30° C. to 100° C., add component (3), maintain the temperature at 90-110° C. for 1-3 hours, filter, wash the filtrate with an aromatic hydrocarbon or an alkane at least 2 times, then mix with the solution of aromatic hydrocarbon or alkane and component (2) at 80° C.-100° C. for 1-3 hours, filter, wash 3 to 6 times with aromatic hydrocarbon or alkane, and dry.

Component (1) can be synthesized according to a variety of prior art, preferably a process step above atmospheric pressure is included, i.e., component (1) is subjected to a high pressure treatment. Preferably, the inert solvent suspension containing the component (1) is directly added to the autoclave, and the reaction is carried out at a temperature higher than 80° C. under a pressure higher than atmospheric pressure, and a high pressure carrier is then obtained.

The solid catalyst component obtained according to the present invention can be used for the preparation of an olefin polymerization catalyst comprising the following components or reaction products of the following components:
A) the above solid catalyst component;
B) at least one organoaluminum compound of the formula $AlR_nX_{(3-n)}$ wherein R is hydrogen, $C_{1-20}$ hydrocarbon group; X is a halogen, and n is an integer of $0 \leq n \leq 3$;
C) optionally, an external electron donor compound.

The organoaluminum compound of the component B) is at least one selected from the group consisting of trialkyl aluminum compound, trialkyl aluminum and alkyl aluminum halide, alkyl aluminum hydride, and alkyl aluminum sesquichloride.

Preferably, the organoaluminum compound may be selected from the group consisting of trialkyl aluminum compounds such as trimethyl aluminum, triethyl aluminum, triisobutyl aluminum, tri-n-butyl aluminum, tri-n-hexyl aluminum, and tri-octyl aluminum. The organoaluminum compound may also be a mixture of trialkylaluminum and alkylaluminum halide, alkylaluminum hydride or alkylaluminum sesquichloride such as $AlEt_2Cl$ and $Al_2Et_3Cl_3$, or is an alkyl chlorooxane.

The external electron donor compound of the component C) may be selected from the group consisting of siloxane compounds of the formula $R^I_x R^{II}_y Si(OR)_z$, wherein R, $R^I$ and $R^{II}$ are the same or different $C_1$-$C_{18}$ hydrocarbon groups, optionally containing heteroatoms, x, y, and z satisfy: $0 \leq x$, $y < 4$, $0 < z \leq 4$, and $x+y+z=4$.

Specifically, the silicone compound includes, but is not limited to, methylcyclohexyldimethoxysilane, methylphenyldimethoxysilane, trimethylmethoxysilane, trimethylethoxysilane, tri-n-propylmethoxysilane, tri-n-propyl ethoxysilane, tri-n-butylmethoxysilane, triisobutylethoxysilane, tricyclohexylmethyl silane, tricyclohexylethoxysilane, dimethyldimethoxysilane, dimethyl diethoxysilane, di-n-propyldimethoxysilane, diisopropyldimethoxysilane, di-n-propyl diethoxysilane, diisopropyldiethoxysilane, di-n-butyldiethoxysilane, diisobutyldiethoxysilane, di-tert-butyldimethoxysilane, di-tert-butyldimethoxysilane, di-n-butyldimethoxysilane, diisobutyldimethoxysilane, di-tert-butyldiethoxysilane, di-n-butyldiethoxysilane, n-butylmethyldimethoxysilane, di(2-ethylhexyl)dimethoxysilane, di(2-ethylhexyethoxysilane, dicyclohexyldimethoxysilane, dicyclohexyldiethoxysilane, dicyclopentyldimethoxysilane, dicyclopentyldiethoxysilane, cyclohexylmethyldimethoxysilane, cyclohexylmethyldiethoxysilane, cyclohexylethyldimethoxysilane, cyclohexylisopropyldimethoxysilane, cyclohexylethyldiethoxysilane, cyclopentylmethyldimethoxysilane, cyclopentylethyldiethoxysilane, cyclopentylisopropyldiethoxysilane, cyclopentylisobutyldimethoxysilane, cyclohexyl-n-propyldimethoxysilane, cyclohexyl-n-propyldiethoxysilane, cyclohexyl-n-butyldiethoxysilane, pentylmethyldimethoxysilane, pentylmethyldiethoxysilane, pentylethyldimethoxysilane, pentylethyldiethoxysilane, cyclohexyldimethylmethoxysilane, cyclohexylmethyldiethoxysilane, cyclohexylethyldimethoxysilane, cyclohexyldiethylethoxysilane, 2-ethylhexyltrimethoxysilane, cyclohexyldimethoxysilane, cyclohexyldiethoxysilane, 2-ethylhexyltriethoxysilane, ethyltrimethoxysilane, ethyltriethoxysilane, n-propyltrimethoxysilane, n-propyltriethoxysilane, isopropyltrimethoxysilane, isopropyltriethoxysilane, n-butyltrimethoxysilane, isobutyltrimethoxysilane, tert-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, 2-ethylhexyltrimethoxysilane, 2-ethylhexyltriethoxysilane, pentyltrimethoxysilane, pentyltriethoxysilane, tetramethoxysilane, tetraethoxysilane, cyclohexylcyclopentyldimethoxysilane, cyclohexylcyclopentyldiethoxysilane, cyclohexylcyclopentyldipropoxysilane, 3-methylcyclohexylcyclopentyldimethoxysilane, 4-methylcyclohexylcyclopentyldimethoxysilane, 3,5-dimethylcyclohexylcyclopentyldimethoxysilane, 3-methylcyclohexylcyclohexyldimethoxysilane, di(3-methylcyclohexyl)dimethoxysilane, 4-methylcyclohexylcyclohexyldimethoxysilane, di(4-methylcyclohexyl)dimethoxysilane, 3,5-dimethylcyclohexylcyclohexyldimethoxysilane, di(3,5-dimethylcyclohexyl)dimethoxysilane, tetrapropoxysilane, tetrabutoxysilane.

Preferred examples among these silicon compounds are given below: di-n-propyldimethoxysilane, di-n-butyldimethoxysilane, diisobutyldimethoxysilane, di-tert-butyldimethoxysilane, di-n-butyldiethoxysilane, tert-butyltrimethoxysilane, dicyclohexyldimethoxysilane, dicyclohexyldiethoxysilane, cyclohexylmethyldimethoxysilane, cyclohexylethyldiethoxysilane, cyclohexylethyldimethoxysilane, cyclohexylethyldiethoxysilane, cyclopentylmethyldimethoxysilane, cyclopentylmethyldiethoxysilane, cyclopentylethyldimethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane and 3,5-dimethylcyclopentyldimethoxysilane and the like. These compounds C may be used alone or in combination.

The olefin polymerization catalyst of the present invention preferably comprises the following components or reaction products of the following components, that is, no external electron donor is required:

A) the above solid catalyst components;
B) at least one organoaluminum compound of the formula $AlR_nX_{(3-n)}$ wherein R is hydrogen, $C_{1-20}$ hydrocarbon group; X is a halogen, and n is an integer of $0 \leq n \leq 3$.

In order to carry out olefin polymerization using the catalyst of the present invention, the above-mentioned catalyst prepared by the components A, B or C can be applied to both homopolymerization and copolymerization. Usually, the molar ratio of Al in component B to Ti in component A is 1-1000, preferably 50-800; when component C is contained, the molar ratio of component C to component B is 0.002-10, preferably 0.01-2, preferably 0.01-0.5.

The olefin polymerization, homopolymerization and copolymerization preferably use only the above-mentioned catalyst prepared by the components A and B, and the molar ratio of Al in the component B to Ti in the component A is 1-1000, preferably 50-800.

The order of addition of the components is arbitrary, the component B is first added to the polymerization system, and then the component A is preferably added; when the component C is used, the component C is added after the component B, and the component A is preferably added finally.

The polymerization process in the present invention can be carried out with or without a solvent. The olefin monomer can be in the form of gas phase or in liquid phase. Hydrogen can be further added as a molecular weight regulator. Of course, the polymerization can also be carried out without a molecular weight regulator. The polymerization temperature should not be higher than 200° C., preferably not higher than 100° C. The polymerization pressure should not exceed 10 MPa, preferably not exceed 5 MPa. Both continuous polymerization and batch polymerization processes can be applied. Moreover, the polymerization can be carried out in one step, two steps or in multiple steps.

The olefin to be homopolymerized or copolymerized by using the catalyst of the present invention includes linear olefins: ethylene, propylene, 1-butene, 1-pentene, 1-hexene, 1-heptene, 1-nonene, 1-decene; branched olefins such as 3-methyl-1-butene and 4-methyl-1-pentene; diolefins such as butadiene, vinylcyclopentene and vinylcyclohexene. The catalyst of the present invention is preferably used for polyethylene and polypropylene. These olefins may be used alone or in combination.

The olefin polymerization (hereinafter referred to as bulk polymerization) carried out by using the catalyst component A, B or C of the present invention can be prepolymerized to increase the activity of the catalyst, the isotacticity of the polymer, the particle properties and the like. This prepolymerization process can also be used for homopolymerization of styrene.

The components and monomers in the prepolymerization process are added in any order. Preferably, component B is first added to the olefin containing inert gas or olefin which is to be polymerized, and then one or more olefins to be polymerized are added after component A. In the olefin prepolymerization of using component C, it is recommended to add component B to a prepolymerization system of an inert gas or an olefin to be polymerized, and then component C (in the case of component C), component A and finally the olefin.

The alkoxymagnesium supported olefin polymerization catalyst component and catalyst of the present invention have the following advantages:

1) When the present invention uses an alkoxymagnesium carrier to prepare a catalyst component, an ortho-phenylene diester compounds (including an ortho-phenylene fatty diester and an ortho-phenylene aromatic diester) and 1,3-diether compound, two internal electron donors are used simultaneously with a molar ratio of the two electron donor compounds controlled within a certain range. The obtained catalyst component has an ultrahigh polymerization activity for olefin polymerization, which is much higher than that of the catalyst using either ortho-phenylene diester compound or the diether compound that is electron donor and may be up to twice as much as the activity of the diether electron donor catalyst. The obtained polymer has a wide molecular weight distribution, thus overcoming the disadvantage of narrow molecular weight distribution of the polymer when using diether internal electron donor catalyst;

2) When the combined internal electron donors of the present invention are used, the activity of the catalyst prepared by using the alkoxy magnesium caner is also higher than that of the catalyst prepared by using the magnesium chloride alcoholate carrier and the catalyst prepared by the dissolution precipitation method;

3) At the same time, the present invention preferably uses a high-pressure treated magnesium alkoxide as a carrier to further increase the activity of the catalyst;

4) The catalyst of the present invention still has high isotacticity when no external electron donor is used, has ultra-high activity, and maintains a high level of activity as the polymerization time is extended;

5) The polyolefin prepared by using the alkoxymagnesium supported olefin polymerization catalyst component and the catalyst of the invention has the advantages of low ash content, long activity period and the like.

EMBODIMENTS

The invention will be described in detail below by way of examples, but the invention is not limited thereto.

The terms used herein is for the purpose of illustration of the specific examples and not intend to limit the invention. Unless otherwise defined, all terms (including technical and scientific terms) used herein are understood the same way by those of ordinary skill in the art. It must also be made clear that, terms such as those generally defined in a dictionary should be interpreted as having a consistent meaning in the context of the present specification and the related art, and should not be interpreted in an idealized or too formalized way, except explicitly defined herein.

The procedures for preparing the catalyst in the examples were all carried out under the protection of high purity nitrogen.

Determination of Polymer Isotacticity

It was determined by heptane extraction (extraction with boiling heptane for 6 hours). Two grams of dried polymer sample was placed in an extractor and extracted with boiling heptane for 6 hours. The ratio of the weight of the polymer (g) obtained by drying the residue to constant weight to 2 was isotacticity.

Determination of Molecular Weight Distribution of Polymer

It was determined by PL-220 gel permeation chromatography using trichlorobenzene as a solvent at 150° C. (standard: polystyrene, flow rate 1.0 mL/min, column: 3×Plgel 10 um M1Xed-B 300×7.5 nm).

Determination of Polymer Ash Content

It was determined according to GB/T 9345.1-2008.

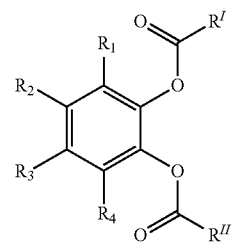
(I)

TABLE 1

| | | Structure of formula (I) | |
|---|---|---|---|
| Compound No. | Name of internal electron donor a compound | $R^1$, $R^2$, $R^3$, $R^4$ | $R^I$, $R^{II}$ |
| a1 | 1,2-benzenediol-1,2-dicyclohexylcarboxylate | all H | $R^I$, $R^{II}$ are $C_6H_{11}$ |
| a2 | 1,2-benzenediol-4-tert-butyl-1,2-dicyclohexylcarboxylate | $R^2$ is $^tC_4H_{10}$, the rest is all H | $R^I$, $R^{II}$ are $C_6H_{11}$ |
| a3 | 1,2-benzenediol-4-tert-butyl-1,2-di-n-hexanoate | $R^2$ is $^tC_4H_{10}$, the rest is all H | $R^I$, $R^{II}$ are $C_5H_{11}$ |
| a4 | 1,2-benzenediol-4-tert-butyl-1,2-di-n-decanoate | $R^2$ is $^tC_4H_{10}$, the rest is all H | $R^I$, $R^{II}$ are $C_9H_{19}$ |
| a5 | 1,2-benzenediol-4-tert-butyl-1,2-dilaurate | $R^2$ is $^tC_4H_{10}$, the rest is all H | $R^I$, $R^{II}$ are $C_{11}H_{23}$ |
| a6 | 1,2-benzenediol-4-tert-butyl-1,2-dimyristate | $R^2$ is $^tC_4H_{10}$, the rest is all H | $R^I$, $R^{II}$ are $C_{13}H_{27}$ |
| a7 | 1,2-benzenediol-3-methyl-5-tert-butyl-1,2-dipalmitate | $R^1$ is $^tCH_3$, $R^3$ is $^tC_4H_{10}$, $R^2$, $R^3$ are H | $R^I$, $R^{II}$ are $C_{15}H_{31}$ |
| a8 | 1,2-benzenediol-3-methyl-5-tert-butyl-1,2-difurancarboxylate | $R^1$ is $^tCH_3$, $R^3$ is $^tC_4H_{10}$, $R^2$, $R^3$ are H | $R^I$, $R^{II}$ are $C_5H_3O$ |

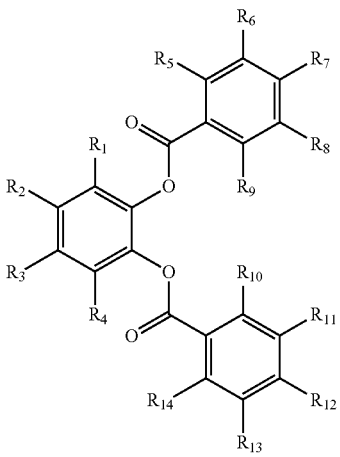
(III)

TABLE 2

| | | Structure of formula (III) | |
|---|---|---|---|
| Compound No. | Name of internal electron donor a compound | $R^1$-$R^4$ | $R^5$-$R^{14}$ |
| a9 | 1,2-benzenediol-1,2-dibenzoate | are all H | are all H |
| a10 | 1,2-benzenediol-4-tert-butyl-1,2-dibenzoate | $R^2$ is $^tC_4H_{10}$, the rest is all H | are all H |

TABLE 2-continued

| Compound No. | Name of internal electron donor a compound | Structure of formula (III) R¹-R⁴ | R⁵-R¹⁴ |
|---|---|---|---|
| a11 | 1,2-benzenediol-4-tert-butyl-1,2-di(o-chlorobenzoate) | $R^2$ is $^tC_4H_{10}$, the rest is all H | $R^7$ and $R^{12}$ is Cl, the rest is all H |
| a12 | 1,2-benzenediol-4-tert-butyl-1,2-di(m-chlorobenzoate) | $R^2$ is $^tC_4H_{10}$, the rest is all H | $R^6$ and $R^{11}$ is Cl, the rest is all H |
| a13 | 1,2-benzenediol-4-tert-butyl-1,2-di(p-chlorobenzoate) | $R^2$ is $^tC_4H_{10}$, the rest is all H | $R^5$ and $R^{10}$ is Cl, the rest is all H |
| a14 | 1,2-benzenediol-4-tert-butyl-1,2-di(p-methylbenzoate) | $R^2$ is $^tC_4H_{10}$, the rest is all H | $R^7$ and $R^{12}$ is $CH_3$, the rest is all H |
| a15 | 1,2-benzenediol-4-chloro-1,2-dibenzoate | $R^2$ is Cl, the rest is all H | are all H |
| a16 | 1,2-benzenediol-3-methyl-5-tert-butyl-1,2-di(m-chlorobenzoate) | $R^1$ is $^tCH_3$, $R^3$ is $^tC_4H_{10}$, $R^2$, $R^3$ are all H | $R^6$ and $R^{11}$ is Cl, the rest is all H |

EXAMPLE 1

In a four-necked flask equipped with a stirrer, a reflux condenser was installed and connected to a cumulative gas meter. 70.8 mL of anhydrous ethanol and 1.26 g of iodine were added after the entire reaction apparatus was fully purged with nitrogen. 6 g of magnesium was added thereto after the iodine was dissolved, and the mixture was heated to reflux temperature of ethanol with stirring, and 47 mL of anhydrous ethanol and 6 g of magnesium powder were added every 10 minutes from the start of reflux to a total of 3 times. The liquid viscosity began to rise sharply about 1-2 hours after the completion of the third addition. At this time, 240 mL of ethanol was added to the reaction system, and the reaction was continued until hydrogen gas was no longer generated at the end of the reaction. The entire reaction time was about 6 hours. The remaining liquid was filtered off under pressure, and the filtrate was washed three times with 1200 mL of toluene to give diethoxymagnesium.

A suspension was prepared by adding 10 g of the above-prepared diethoxymagnesium and 80 mL of toluene at −10° C. to 500 ml of a 5-neck flask with a stirrer fully purged with nitrogen, and then 20 mL of titanium tetrachloride was dropwise added at −10° C. After completion of the addition, the system was slowly heated to 10° C. and 60 mL of titanium tetrachloride was added dropwise, then the system was slowly heated to 80° C., and 3 g of electron donor a1 and 1.5 g of 9,9-dimethoxymethylfluorene were added. Thereafter, the temperature was further raised to 120° C. and maintained for 2 hours, then the solution was filtered under pressure until the liquid was filtered off. The obtained solid was washed three times with 120 mL of titanium tetrachloride at 120° C., washed three times with 150 mL of hexane at 60° C., washed three times at room temperature, followed by filtering off the liquid. The resulting solid was dried to give a solid powder, ie. solid catalyst component CAT-1.

EXAMPLES 2-16

The catalyst component was prepared in the same manner as in Example 1, except that the internal electron donor compound was sequentially changed to 3 g a2-a16 and 1.5 g of 9,9-bismethoxymethylfluorene to give solid catalyst components CAT-2-16, respectively. The results obtained are shown in Table 3.

EXAMPLE 17

The catalyst component was prepared in the same manner as in Example 1, except that the internal electron donor compound was sequentially changed to 3 g of a10 and 2 g of 9,9-bismethoxymethylfluorene to give a solid catalyst component CAT-17.

EXAMPLE 18

The catalyst component was prepared in the same manner as in Example 1, except that the internal electron donor compound was sequentially changed to 3 g a10 and 1 g of 2-isopropyl-2-isopentyl-1,3-dimethoxypropane to give a solid catalyst CAT-18.

EXAMPLE 19

In a four-necked flask equipped with a stirrer, a reflux condenser was installed and connected to a cumulative gas meter. After the entire reaction apparatus was sufficiently replaced with nitrogen, 50 mL of anhydrous anaerobic ethanol and 0.55 g of iodine were added to the vessel. After the iodine was dissolved, 6 g of metallic magnesium was added thereto, and the temperature was raised to the reflux temperature of ethanol with stirring, and 90 mL of anhydrous ethanol and 9 g of magnesium powder were added every 10 minutes from the start of the reflux to a total of three times. The liquid viscosity began to rise sharply about 1-2 hours after the completion of the third addition (at this time, the reaction rate can be calculated to be about 85% by the amount of hydrogen generated), and then 150 mL of ethanol was added to the reaction system, and the reaction was continued until hydrogen gas was no longer generated at the end of the reaction. The entire reaction time is about 6 hours and a suspension containing a white solid powder was obtained. The suspension was placed in an autoclave, stirred at 145° C., 1.4 MPa for 3 hours, and dried by pressure filtration to give a carrier Mg(OEt)₂.

A suspension was prepared by adding 10 g of the above-prepared diethoxymagnesium and 80 mL of toluene at −10° C. to 500 ml of 5-neck flask with a stirrer fully purged with nitrogen, and then 20 mL of titanium tetrachloride was dropwise added at −10° C. After completion of the addition, the system was slowly heated heated to 10° C., and 60 mL of titanium tetrachloride was added dropwise, then the system was slowly heated to 80° C., and 3 g of electron donor compound a10 and 2 g 9,9-dimethoxymethylfluorene were added. Thereafter, the temperature was further raised to 120° C. and maintained for 2 hours, then the solution was filtered under pressure until the liquid was filtered off, and the obtained solid was washed three times with 120 mL of titanium tetrachloride at 120° C., washed three times with 150 mL of hexane at 60° C., washed three times at room temperature, followed by filtering off the liquid. The resulting solid was dried to give a solid catalyst component CAT-19.

EXAMPLE 20

The catalyst component was prepared in the same manner as in Example 19 except that the internal electron donor compound was sequentially changed to 3 g a10 and 1 g of 2-isopropyl-2-isopentyl-1,3-dimethoxypropane to give a solid catalyst component CAT-20.

COMPARATIVE EXAMPLE 1

The catalyst component was prepared in the same manner as in Example 1, except that the internal electron donor compound was changed to 3 g of 9,9-bismethoxymethyl-fluorene to give a solid catalyst component REF-1.

COMPARATIVE EXAMPLE 2

The catalyst component was prepared in the same manner as in Example 1, except that the internal electron donor compound was changed to 3 g of the electron donor 2-isopropyl-2-isopentyl-1,3-dimethoxypropane to give a solid catalyst component REF-2.

COMPARATIVE EXAMPLE 3

The catalyst component was prepared in the same manner as in Example 1, except that the internal electron donor compound was changed to 4.5 g of the electron donor a10 to give a solid catalyst component REF-3.

COMPARATIVE EXAMPLE 4

The catalyst component was prepared in the same manner as in Example 1, except that the internal electron donor compound was changed to 3 g of di-n-butyl phthalate to give a solid catalyst component REF-4.

COMPARATIVE EXAMPLE 5

In a 500 ml of 5-necked flask with a stirrer fully purged with nitrogen, 150 mL of titanium tetrachloride was pre-cooled to −15° C., and 10 g of $MgCl_2 \cdot 2.5C_2H_5OH$ microspheres was added at −15° C. to prepare a suspension. After the temperature was maintained at −15° C. for 3 hours and slowly raised to 80° C., 3 g of electron donor compound a10 and 1.5 g of 9,9-dimethoxymethyl fluorene were added, and then the temperature was raised to 110° C. and maintained for 1 hour. Thereafter the solution was filtered under pressure under the liquid was filtered off. The obtained solid was washed 3 times with 125 mL of titanium tetrachloride at 125° C., washed 4 times with 150 mL of hexane at 60° C., followed by filtering off the liquid. The resulting solid was dried to give a solid catalyst component REF-5.

COMPARATIVE EXAMPLE 6

7.1 g of anhydrous magnesium chloride, 38 mL of decane and 35 mL of 2-ethylhexanol were reacted at 130° C. for 2 hours to form a homogeneous solution. 1.7 g of phthalic anhydride was added to the solution, and the mixture was stirred at 130° C. for 1 hour to completely dissolve the phthalic anhydride in the homogeneous solution. The obtained homogeneous solution was cooled to room temperature, and dropwise added to 200 mL of titanium tetrachloride kept at −20° C. in 1 hour. After the addition, the mixed solution was heated to 110° C. in 4 hours, when the temperature reached 110° C., 3 g of the electron donor compound a10 and 1.5 g of 9,9-dimethoxymethylfluorene were added, the mixture was stirred at the above temperature for 2 hours. After reacting for 2 hours, the solid portion was collected by hot filtration. The solid portion was suspended in 275 mL of titanium tetrachloride and reacted at 110° C. for 2 hours. After the reaction, the solid portion was collected by hot filtration, thoroughly washed with decane and hexane at 110° C., and then dried to give a solid catalyst component REF-6.

COMPARATIVE EXAMPLE 7

In 500 ml of a 5-necked flask with a stirrer fully purged with nitrogen, 10 g of anhydrous magnesium chloride, 150 mL of toluene, 17 mL of epoxy chloropropane and 16 mL of tributyl phosphate were added at room temperature, and the temperature was raised to 50° C. with stirring and maintained for 2 hours. After the solid was completely dissolved, 2.40 g of phthalic anhydride was added and maintained for 1 hour. The solution was cooled to −25° C., 110 mL of titanium tetrachloride was dropwise added over 1 hour, and the temperature was slowly raised to 80° C., and the solid matter was gradually precipitated during the temperature rise. 3 g of the electron donor compound a10 and 1.5 g of 9,9-dimethoxymethylhydrazine were added and maintained at 80° C. for 1 hour. After filtering, the (iterate was washed twice with 200 mL of toluene, then 120 mL of toluene and 80 mL of titanium tetrachloride were added, and the temperature was further raised to 110° C., and maintained for 2 hours. The liquid was filtered under pressure and the treatment was repeated once more. The liquid was filtered off, and the obtained solid was washed once with 100 mL of dichloroethane, and then washed four times with hexane to give solid catalyst component REF-7.

Polymerization Condition 1

The solid catalysts prepared in Examples 1-20 and Comparative Examples 1-6 were used as components for the olefin polymerization catalyst to carry out polymerization evaluation under the following conditions:

To a 5 L of stainless steel reactor fully purged with nitrogen were added 4 mL of 0.5 mol/L triethylaluminum solution in hexane, 1 mL of 0.1 mol/L methylcyclohexyldi-methoxysilane (CMMS) solution in hexane and 5 mg of prepared catalyst, then 10 mL of hexane was added to rinse the feed line, and 2 L of hydrogen (standard state) and 2.5 L of refined propylene were added. The reaction was controlled to prepolymerize at 20° C. for 5 minutes, the temperature was raised to 70° C., and the polymerization was carried out at this temperature for 1 hour. After completion of the reaction, the reaction vessel was cooled and the stirring was stopped to discharge the reaction product, and then a polymer was obtained after drying. The polymerization results were shown in Table 3.

TABLE 3

| No. | Catalyst No. | Internal electron donor compound a | Internal electron donor compound b | a/b (mol/mol) | Activity KgPP/gCat | Isotacticity % | Molecular weight distribution $M_w/M_n$ |
|---|---|---|---|---|---|---|---|
| example 1 | CAT-1 | a1 | b1 | 1.54 | 89 | 97.7 | 5.6 |
| example 2 | CAT-2 | a2 | b1 | 1.32 | 76 | 97.6 | 5.7 |
| example 3 | CAT-3 | a3 | b1 | 1.40 | 77 | 97.6 | 5.8 |
| example 4 | CAT-4 | a4 | b1 | 1.07 | 86 | 97.4 | 6.0 |
| example 5 | CAT-5 | a5 | b1 | 0.96 | 80 | 97.8 | 5.9 |
| example 6 | CAT-6 | a6 | b1 | 0.87 | 81 | 97.4 | 5.8 |
| example 7 | CAT-7 | a7 | b1 | 0.77 | 79 | 97.3 | 6.0 |
| example 8 | CAT-8 | a8 | b1 | 1.64 | 76 | 98.0 | 6.1 |
| example 9 | CAT-9 | a9 | b1 | 1.60 | 94 | 98.1 | 6.5 |
| example 10 | CAT-10 | a10 | b1 | 1.36 | 106 | 98.9 | 7.1 |
| example 11 | CAT-11 | a11 | b1 | 1.18 | 93 | 98.2 | 6.2 |
| example 12 | CAT-12 | a12 | b1 | 1.18 | 99 | 98.0 | 6.2 |
| example 13 | CAT-13 | a13 | b1 | 1.18 | 101 | 98.0 | 6.1 |
| example 14 | CAT-14 | a14 | b1 | 1.33 | 96 | 98.3 | 6.5 |
| example 15 | CAT-15 | a15 | b1 | 1.44 | 93 | 98.1 | 6.5 |
| example 16 | CAT-16 | a16 | b1 | 1.11 | 105 | 98.3 | 6.9 |
| example 17 | CAT-17 | a10 | b1 | 1.02 | 115 | 98.8 | 7.2 |
| example 18 | CAT-18 | a10 | b2 | 1.73 | 108 | 99.0 | 8.4 |
| example 19 | CAT-19 | a10 | b1 | 1.02 | 138 | 99.2 | 7.5 |
| example 20 | CAT-20 | a10 | b2 | 1.73 | 129 | 98.9 | 8.2 |
| comparative example 1 | REF-1 | — | b1 | — | 65 | 98.8 | 4.5 |
| comparative example 2 | REF-2 | — | b2 | — | 60 | 98.2 | 4.8 |
| comparative example 3 | REF-3 | a10 | — | — | 49 | 98.0 | 8.9 |
| comparative example 4 | REF-4 | — | c | — | 45 | 98.4 | 5.4 |
| comparative example 5 | REF-5 | a10 | b1 | 1.36 | 88 | 98.2 | 7.1 |
| comparative example 6 | REF-6 | a10 | b1 | 1.36 | 75 | 98.4 | 7.6 |
| comparative example 7 | REF-7 | a10 | b1 | 1.36 | 74 | 98.3 | 7.3 |

Note:
b1 is 9,9-dimethoxymethylfluorene
b2 is 2-isopropyl-2-isopentyl-1,3-dimethoxypropane
c is di-n-butyl phthalate
"—" means empty It can be seen from the data in Table 3 that Examples 1-16 respectively used 16 kinds of different ortho-phenylenedicarboxylate compounds to combine with 9,9-dimethoxymethylfluorene in different molar ratios as internal electron donor compound. The prepared catalysts had high activity of 72-106 KgPP/gCat under the conditions, the obtained polymers had isotacticity higher than 97.4%, and the molecular weight distribution was between 5.3 and 7.1 that was wider than that of the diether catalyst.

When the same ethoxy magnesium carrier was used, the activity of the catalyst obtained by use of the compound of ortho-phenylenedicarboxylate and the diether (72-106 KgPP/gCat of Examples 1-16) was much higher than that of the catalysts obtained by single use of 9,9-dimethoxymethylfluorene (65 KgPP/gCat of Comparative Example 1), 2-isopropyl-2-isopentyl-1,3-dimethoxypropane (60 KgPP/gCat of Comparative Example 2), 1,2-benzenediol-4-tert-butyl-1,2-dibenzoate (49 KgPP/gCat of Comparative Example 3) or di-n-butyl phthalate (45 KgPP/gCat of Comparative Example 4) as an internal electron donor.

The catalyst prepared by using the ethoxy magnesium carrier after high pressure treatment (Example 19 activity 138 KgPP/gCat and Example 20 activity 129 KgPP/gCat), has an activity higher than those prepared by using the internal electron donor (Example 17 activity 115 KgPP/gCat and Example 18 activity 108 KgPP/gCat) with the same type and ratio without high pressure treatment (above atmospheric pressure).

The catalyst activity prepared using the ethoxy magnesium carrier (76-138 KgPP/gCat of Examples 1-20) in total was higher than the catalyst prepared by using the magnesium chloride alcoholate carrier (88 KgPP/gCat of Comparative Example 5) and the catalyst prepared by the dissolution precipitation method (75 KgPP/gCat of Comparative Example 6 and 74 KgPP/gCat of Comparative Example 7). It is indicated that the ethoxy magnesium carrier is more advantageous than the magnesium chloride alcoholate carrier and the activated carrier obtained after dissolution and precipitation to exert the catalytic activity of the complex system of ortho-phenylenedicarboxylate compound and the diether compound.

Polymerization Condition 2

The polymerization evaluation was carried out by using a solid catalyst as a component of the olefin polymerization catalyst under the following conditions:

To a 5 L stainless steel reactor sufficiently purged with nitrogen were added a solution of 0.5 mol/L of triethylaluminum in hexane (the amount of triethylaluminum is shown in Al/Ti in Table 4) and prepared 3-5 mg of catalyst were added. Then, 10 mL of hexane was added to rinse the feed line, and 2 L of hydrogen (standard state) and 2.5 L of refined propylene were added thereto. The reaction was controlled to prepolymerize at 20° C. for 5 minutes and the temperature was raised to 70° C. At this temperature, the polymerization reaction was carried out for corresponding time (see Table 4). After completion of the reaction, the reaction vessel was cooled and the stirring was stopped to discharge the reaction product, and then a polymer was obtained after drying. The results obtained were shown in Table 4.

EXAMPLES 21-26

Polymerization was carried out using Catalyst CAT-19 according to the conditions described in Polymerization Conditions 2 and Table 4, and the polymerization results were shown in Table 4.

EXAMPLES 27-32

Polymerization was carried out using Catalyst CAT-20 according to the conditions described in Polymerization Conditions 2 and Table 4, and the polymerization results were shown in Table 4.

COMPARATIVE EXAMPLES 10-14

The polymerization was carried out using the catalyst REF-1-REF-7 according to the conditions described in the polymerization conditions 2 and Table 4, respectively, and the polymerization results were shown in Table 4.

It can be seen from the data in Table 4 that the catalysts CAT-19 and CAT-20 prepared by using the ethoxy magnesium carrier and compounding the ortho-phenylene diester compound and the diether compound could have ultrahigh activity with no use of the external electron donor compound during polymerization, which is much higher than that of the non-complexed catalysts under the same polymerization conditions (Comparative Examples 8-11) and the catalysts prepared by using the magnesium chloride alcoholate carrier or the dissolution precipitation method (Comparative Examples 12-14), and still maintain a high isotacticity of 97.9% or more. When the polymerization time is extended from 60 minutes to 90 minutes and 120 minutes, the catalyst can maintain ultra high activity without attenuation. The polypropylene obtained by using low Al/Ti has a lower ash content that can be reduced to a minimum of 18 ppm.

Although the present invention has been described in detail with reference to the preferred embodiments of the present invention, it will be apparent to those skilled in the art to make modifications or improvements. Therefore, such modifications or improvements made without departing from the spirit of the invention are intended to be within the scope of the invention.

INDUSTRIAL APPLICABILITY

The present invention provides an alkoxy magnesium supported olefin polymerization catalyst component, com-

TABLE 4

| No. | Catalyst No. | Al/Ti (mol/mol) | Polymerization time (min) | Polymerization activity (KgPP/gCat) | Isotacticity % | molecular weight distribution $M_w/M_n$ | Polymer ash content (ppm) |
|---|---|---|---|---|---|---|---|
| example 21 | CAT-19 | 500 | 60 | 201 | 98.4 | 6.9 | 249 |
| example 22 | CAT-19 | 500 | 90 | 249 | 98.3 | 6.8 | 210 |
| example 23 | CAT-19 | 500 | 120 | 272 | 98.1 | 6.8 | 163 |
| example 24 | CAT-19 | 200 | 60 | 210 | 98.2 | 6.9 | 60 |
| example 25 | CAT-19 | 100 | 60 | 225 | 98.0 | 7.0 | 28 |
| example 26 | CAT-19 | 90 | 120 | 287 | 98.1 | 6.9 | 18 |
| example 26 | CAT-20 | 500 | 60 | 182 | 98.5 | 7.5 | 233 |
| example 27 | CAT-20 | 500 | 90 | 210 | 98.3 | 7.4 | 197 |
| example 28 | CAT-20 | 500 | 120 | 251 | 98.2 | 7.5 | 159 |
| example 29 | CAT-20 | 200 | 60 | 190 | 98.0 | 7.6 | 82 |
| example 30 | CAT-20 | 100 | 60 | 208 | 98.1 | 7.6 | 33 |
| example 32 | CAT-20 | 90 | 120 | 260 | 98.0 | 7.5 | 20 |
| comparative example 8 | REF-1 | 500 | 60 | 104 | 98.3 | 4.8 | 158 |
| comparative example 9 | REF-2 | 500 | 60 | 90 | 97.8 | 4.9 | 140 |
| comparative example 10 | REF-3 | 500 | 60 | 79 | 96.2 | 8.0 | 200 |
| comparative example 11 | REF-4 | 500 | 60 | 70 | 97.0 | 5.6 | 194 |
| comparative example 12 | REF-5 | 500 | 60 | 132 | 98.0 | 7.0 | 229 |
| comparative example 13 | REF-6 | 500 | 60 | 110 | 98.2 | 7.1 | 230 |
| comparative example 14 | REF-7 | 500 | 60 | 105 | 98.3 | 6.8 | 190 | prising the reaction products of the following components: at least one alkoxy magnesium compound of Mg(OR1')N (OR2')2-N, at least one titanium compound of general formula Ti(OR)nX4-n, at least one ortho-phenylene diester electron donor compound a, and at least one diether electron donor compound b, wherein the molar ratio of a to b is 0.05 to 20. The catalyst component has an ultrahigh polymerization activity when used for olefin polymerization, and does not require the use of an external electron donor, but can also obtain a polymer with a high isotacticity, and the resulting polymer has a relatively wide molecular weight distribution and a relatively low ash content. The invention has industrial applicability.

What is claimed is:

1. An alkoxymagnesium supported olefin polymerization catalyst component, comprising the reaction products of the following components:
   1) an alkoxymagnesium compound represented by the formula $Mg(OR_1')_N(OR_2')_{2-N}$, wherein $R_1'$ and $R_2'$ may be the same or different and are $C_1$-$C_{20}$ alkyl group, $0 \leq N \leq 2$;
   2) at least one titanium compound represented by the formula $Ti(OR)_nX_{4-n}$, wherein R represents a $C_1$-$C_4$ alkyl group; X represents chlorine, bromine or iodine atom; $0 \leq n \leq 4$;
   3) at least one electron donor a compound and at least one electron donor b compound;
   wherein the electron donor a compound is selected from the group consisting of (a1) 1,2-benzenediol-1,2-dicyclohexylcarboxylate; (a2) 1,2-benzenediol-4-tert-butyl-1,2-dicyclohexylcarboxylate; (a3) 1,2-benzenediol-4-tert-butyl-1,2-di-n-hexanoate; (a4) 1,2-benzenediol-4-tert-butyl-1,2-di-n-decanoate; (a5) 1,2-benzenediol-4-tert-butyl-1,2-dilaurate; (a6) 1,2-benzenediol-4-tert-butyl-1,2-dimyristate; (a7) 1,2-benzenediol-3-methyl-5-tert-butyl-1,2-dipalmitate; (a8) 1,2-benzenediol-3-methyl-5-tert-butyl-1,2-difurancarboxylate; (a9) 1,2-benzenediol-1,2-dibenzoate; (a10) 1,2-benzenediol-4-tert-butyl-1,2-dibenzoate; (a11) 1,2-benzenediol-4-tert-butyl-1,2-di(o-chlorobenzoate); (a12) 1,2-benzenediol-4-tert-butyl-1,2-di(m-chlorobenzoate); (a13)1,2-benzenediol-4-tert-butyl-1,2-di(p-chlorobenzoate); (a14) 1,2-benzenediol-4-tert-butyl-1,2-di(p-methylbenzoate); (a15) 1,2-benzenediol-4-chloro-1,2-dibenzoate; and (a16) 1,2-benzenediol-3-methyl-5-tert-butyl-1,2-di(m-chlorobenzoate);
   wherein the electron donor b compound is selected from the group consisting of diethers of the formula (II):

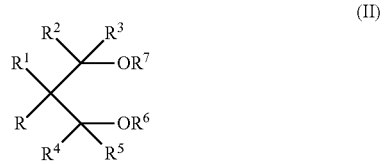

(II)

wherein R, $R^1$, $R^2$, $R^3$, $R^4$ and $R^5$ may be the same or different and represent H or linear or branched alkyl, cycloalkyl, aryl, alkaryl or aralkyl group having 1 to 18 carbon atoms; $R^6$ and $R^7$ may be the same or different and represent linear or branched $C_1$-$C_{20}$ alkyl group, $C_3$-$C_{20}$ cycloalkyl group, $C_5$-$C_{20}$ aryl group, $C_7$-$C_{20}$ alkaryl and $C_7$-$C_{20}$ aralkyl group; one or more groups of R, $R^1$ to $R^7$ may be linked to form a cyclic structure, each of which may comprise one or more heteroatom selected from the group consisting of halogen, N, O, S, P, and Si;

wherein the molar ratio of the electron donor a compound to the electron donor b compound is from 0.77 to 1.54.

2. The catalyst component according to claim 1, wherein the alkoxymagnesium compound is selected from the group consisting of magnesium dimethoxide, magnesium diethoxide, magnesium dipropoxide, magnesium dibutoxide, magnesium ethoxymethoxy, magnesium ethoxypropoxy, and magnesium butoxyethoxy, which is used alone or in combination.

3. The catalyst component according to claim 1, wherein the titanium compound is selected from the group consisting of titanium tetrachloride, titanium tetrabromide, titanium tetraiodide, titanium tetraethoxide, titanium tetrabutoxide, ethoxy titanium trichloride, methoxy titanium trichloride, propoxy titanium trichloride, n-butoxy titanium trichloride, dimethoxy titanium dichloride, diethoxy titanium dichloride, dipropoxy titanium dichloride, di-n-butoxy titanium dichloride, trimethoxy titanium chloride, triethoxy titanium chloride, tripropoxy titanium chloride, and tri-n-butoxy titanium chloride, which may be used alone or in combination.

4. The catalyst component according to claim 1, wherein the electron donor b compound is selected from the diether compounds of the formula (IV):

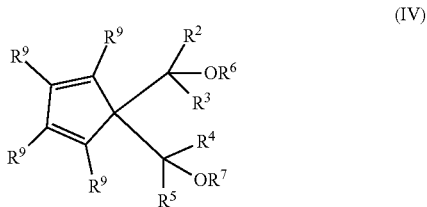

(IV)

wherein the groups $R^6$ and $R^7$ have the same meanings as in the formula (II), and the groups $R^2$, $R^3$, $R^4$, $R^5$ and $R^9$ are the same or different from each other and selected from hydrogen, halogen; linear or branched $C_{1-20}$ alkyl group; $C_{3-20}$ cycloalkyl group, $C_{6-20}$ aryl group, $C_{7-20}$ alkylaryl group and $C_{7-20}$ arylalkyl group, and two or more $R^9$ groups may be bonded to each other to form a condensed cyclic structure, which is saturated or unsaturated and optionally substituted with a group selected from the group consisting of: halogen; linear or branched $C_{1-20}$ alkyl group; $C_{3-20}$ cycloalkyl group, $C_{6-20}$ aryl group, $C_{7-20}$ alkylaryl group and $C_{7-20}$ arylalkyl group.

5. The catalyst component according to claim 4, wherein the electron donor b compound is selected from the diether compounds of the formula (V):

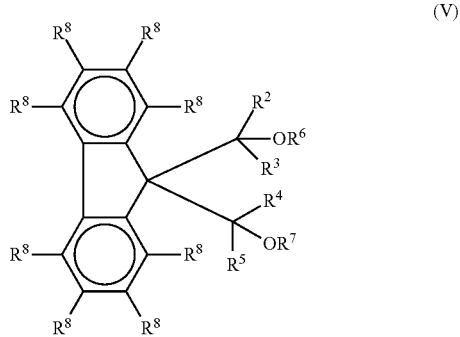

(V)

wherein the $R^8$ groups are the same or different and are hydrogen, halogen, linear or branched $C_{1-20}$ alkyl group; $C_{3-20}$ cycloalkyl group, $C_{6-20}$ aryl group, $C_{7-20}$ alkylaryl group and $C_{7-20}$ arylalkyl group, optionally containing one or more heteroatom selected from the group consisting of N, O, S, P, Si, and halogen as a a substituent for a carbon atom or a hydrogen atom or both; the groups $R^2$, $R^3$, $R^4$, $R^5$, $R^6$ and $R^7$ are defined as in the formula (IV).

6. An olefin polymerization catalyst, comprising the following components or reaction products of the following components:
   A) the solid catalyst component according to claim 1;
   B) at least one organoaluminum compound of the formula $AlR_nX_{(3-n)}$ wherein R is hydrogen, a $C_{1-20}$ hydrocarbon group; X is a halogen, and n is an integer of 0≤n≤3;
   C) optionally, an external electron donor compound.

7. An olefin polymerization catalyst, comprising the following components or reaction products of the following components:
   A) the solid catalyst component according to claim 1;
   B) at least one organoaluminum compound of the formula $AlR_nX_{(3-n)}$ wherein R is hydrogen, $C_{1-20}$ hydrocarbon group; X is a halogen, and n is an integer of 0≤n≤3.

8. The catalyst component according to claim 1, wherein the electron donor b compound is 9,9-dimethoxymethylfluorene or 2-isopropyl-2-isopentyl-1,3-dimethoxypropane.

9. The catalyst component according to claim 1, wherein:
   (A) the electron donor a compound is 1,2-benzenediol-1,2-dicyclohexylcarboxylate, the electron donor b compound is 9,9-dimethoxymethylfluorene, and the molar ratio of the electron donor a compound to the electron donor b compound is 1.54; or
   (B) the electron donor a compound is 1,2-benzenediol-4-tert-butyl-1,2-dicyclohexylcarboxylate, the electron donor b compound is 9,9-dimethoxymethylfluorene, and the molar ratio of the electron donor a compound to the electron donor b compound is 1.32; or
   (C) the electron donor a compound is 1,2-benzenediol-4-tert-butyl-1,2-di-n-hexanoate, the electron donor b compound is 9,9-dimethoxymethylfluorene, and the molar ratio of the electron donor a compound to the electron donor b compound is 1.40; or
   (D) the electron donor a compound is 1,2-benzenediol-4-tert-butyl-1,2-di-n-decanoate, the electron donor b compound is 9,9-dimethoxymethylfluorene, and the molar ratio of the electron donor a compound to the electron donor b compound is 1.07; or
   (E) the electron donor a compound is 1,2-benzenediol-4-tert-butyl-1,2-dilaurate, the electron donor b compound is 9,9-dimethoxymethylfluorene, and the molar ratio of the electron donor a compound to the electron donor b compound is 0.96; or
   (F) the electron donor a compound is 1,2-benzenediol-4-tert-butyl-1,2-dimyristate, the electron donor b compound is 9,9-dimethoxymethylfluorene, and the molar ratio of the electron donor a compound to the electron donor b compound is 0.87; or
   (G) the electron donor a compound is 1,2-benzenediol-3-methyl-5-tert-butyl-1,2-dipalmitate, the electron donor b compound is 9,9-dimethoxymethylfluorene, and the molar ratio of the electron donor a compound to the electron donor b compound is 0.77; or
   (H) the electron donor a compound is 1,2-benzenediol-4-tert-butyl-1,2-dibenzoate, the electron donor b compound is 9,9-dimethoxymethylfluorene, and the molar ratio of the electron donor a compound to the electron donor b compound is 1.36; or
   (I) the electron donor a compound is 1,2-benzenediol-4-tert-butyl-1,2-di(o-chlorobenzoate), the electron donor b compound is 9,9-dimethoxymethylfluorene, and the molar ratio of the electron donor a compound to the electron donor b compound is 1.18; or
   (J) the electron donor a compound is 1,2-benzenediol-4-tert-butyl-1,2-di(m-chlorobenzoate), the electron donor b compound is 9,9-dimethoxymethylfluorene, and the molar ratio of the electron donor a compound to the electron donor b compound is 1.18; or
   (K) the electron donor a compound is 1,2-benzenediol-4-tert-butyl-1,2-di(p-chlorobenzoate), the electron donor b compound is 9,9-dimethoxymethylfluorene, and the molar ratio of the electron donor a compound to the electron donor b compound is 1.18; or
   (L) the electron donor a compound is 1,2-benzenediol-4-tert-butyl-1,2-di(p-methylbenzoate), the electron donor b compound is 9,9-dimethoxymethylfluorene, and the molar ratio of the electron donor a compound to the electron donor b compound is 1.33; or
   (M) the electron donor a compound is 1,2-benzenediol-4-chloro-1,2-dibenzoate, the electron donor b compound is 9,9-dimethoxymethylfluorene, and the molar ratio of the electron donor a compound to the electron donor b compound is 1.44; or
   (N) the electron donor a compound is 1,2-benzenediol-3-methyl-5-tert-butyl-1,2-di(m-chlorobenzoate), the electron donor b compound is 9,9-dimethoxymethylfluorene, and the molar ratio of the electron donor a compound to the electron donor b compound is 1.11; or
   (O) the electron donor a compound is 1,2-benzenediol-4-tert-butyl-1,2-dibenzoate, the electron donor b compound is 9,9-dimethoxymethylfluorene, and the molar ratio of the electron donor a compound to the electron donor b compound is 1.02.

* * * * *